US010154202B2

(12) United States Patent
Gressum

(10) Patent No.: US 10,154,202 B2
(45) Date of Patent: Dec. 11, 2018

(54) APPARATUS FOR ILLUMINATING A SCENE AND CONTROL METHOD THEREOF

(71) Applicant: SAMSUNG ELECTRONICS CO., LTD., Suwon-si (KR)

(72) Inventor: Carl Gressum, London (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 56 days.

(21) Appl. No.: 14/870,969

(22) Filed: Sep. 30, 2015

(65) Prior Publication Data
US 2016/0112622 A1 Apr. 21, 2016

(30) Foreign Application Priority Data

Oct. 15, 2014 (GB) .................................. 1418279.4
Jul. 2, 2015 (KR) ........................ 10-2015-0094930

(51) Int. Cl.
H04N 5/235 (2006.01)
G03B 15/02 (2006.01)
H04N 5/225 (2006.01)
H04N 9/04 (2006.01)
H04N 5/222 (2006.01)

(52) U.S. Cl.
CPC ........... *H04N 5/2354* (2013.01); *G03B 15/02* (2013.01); *H04N 5/2226* (2013.01); *H04N 5/2256* (2013.01); *H04N 5/2351* (2013.01); *H04N 5/2353* (2013.01); *H04N 9/04* (2013.01)

(58) Field of Classification Search
CPC .. H04N 5/2354; H04N 5/2226; H04N 5/2256; H04N 5/2351; H04N 5/2353; H04N 9/04; G03B 15/02

USPC .................................................. 348/370, 371
See application file for complete search history.

(56) References Cited

U.S. PATENT DOCUMENTS

| 4,561,731 | A  | 12/1985 | Kley |
| 6,920,286 | B2 | 7/2005  | Nonaka et al. |
| 7,050,668 | B2 | 5/2006  | Kumaran et al. |
| 7,298,970 | B2 | 11/2007 | Liang et al. |
| 7,722,201 | B2 | 5/2010  | Manger |
| 7,978,201 | B2 | 7/2011  | Cho et al. |
| 8,150,255 | B2 | 4/2012  | Tsai |

(Continued)

FOREIGN PATENT DOCUMENTS

JP 2008-158247 A 7/2008
TW 201024906 A1 7/2010

OTHER PUBLICATIONS

Communication dated Dec. 31, 2014, issued by the Intellectual Property Office of United Kingdom in counterpart British Application No. GB1418279.4.

(Continued)

*Primary Examiner* — Sinh Tran
*Assistant Examiner* — Zhenzhen Wu
(74) *Attorney, Agent, or Firm* — Sughrue Mion, PLLC

(57) ABSTRACT

An apparatus for illuminating a scene to be captured includes an illumination source configured to illuminate the scene; an adaptive optical element configured to be controlled to change an illumination in the scene by the illumination source; and a controller configured to determine an illumination pattern corresponding to the scene, and configured to control the adaptive optical element to change the illumination in the scene by the illumination source based on the determined illumination pattern.

23 Claims, 16 Drawing Sheets

(56) References Cited

U.S. PATENT DOCUMENTS

| | | |
|---|---|---|
| 8,401,378 B2 | 3/2013 | Tsai |
| 8,761,594 B1 | 6/2014 | Gross et al. |
| 8,810,716 B2* | 8/2014 | Nakagawara ........ H04N 5/2256 348/370 |
| 2005/0219405 A1* | 10/2005 | Ichihara .................. G03B 7/16 348/370 |
| 2007/0177050 A1* | 8/2007 | Xiao ...................... G03B 7/091 348/371 |
| 2008/0297621 A1* | 12/2008 | Sun .................... H04N 5/23232 348/224.1 |
| 2010/0007752 A1 | 1/2010 | Myhrvold et al. |
| 2010/0020227 A1* | 1/2010 | Robinson ........... H04N 1/00307 348/371 |
| 2010/0149371 A1* | 6/2010 | Steinberg ............. G06K 9/0061 348/222.1 |
| 2011/0032350 A1* | 2/2011 | Kikuchi ............... A61B 1/0623 348/135 |
| 2012/0177352 A1* | 7/2012 | Pillman ................ H04N 5/2354 396/61 |
| 2013/0016249 A1 | 1/2013 | Mine |
| 2013/0176482 A1* | 7/2013 | Hirasawa ................. G03B 7/16 348/370 |
| 2014/0168799 A1 | 6/2014 | Hubert et al. |
| 2014/0300803 A1 | 10/2014 | Tsai et al. |
| 2015/0085181 A1* | 3/2015 | Chen .................... H04N 5/2354 348/371 |
| 2015/0334282 A1* | 11/2015 | Tan .................... G06K 7/10801 348/360 |
| 2016/0072995 A1* | 3/2016 | Kojima ................. G03B 15/05 348/371 |

OTHER PUBLICATIONS

Communication dated Mar. 23, 2016, from the European Patent Office in counterpart European Application No. 15189532.3.

* cited by examiner

APPARATUS FOR ILLUMINATING A SCENE AND CONTROL METHOD THEREOF

CROSS-REFERENCE TO RELATED APPLICATIONS

This application claims priorities from British Patent Application No. 1418279.4, filed on Oct. 15, 2014, in the British Intellectual Property Office, and Korean Patent Application No. 10-2015-0094930, filed on Jul. 2, 2015, in the Korean Intellectual Property Office, the disclosures of which are incorporated herein in their entireties by reference.

BACKGROUND

1. Field

Apparatuses and methods consistent with exemplary embodiments relate to a camera or an electronic apparatus (e.g., a smartphone) comprising a camera, and more particularly, to an electronic apparatus comprising an adaptive optical element which can be controlled to change an illumination pattern provided by an illumination source.

2. Description of the Related Art

When an image is captured in a low-light setting, an illumination source such as a flash can be used to temporarily increase the amount of light in a scene being captured. The illumination source may not be capable of sufficiently illuminating the scene because illumination sources used in portable devices are not designed to reproduce a sufficient amount of light to illuminate a whole scene. Consequently, by using a related art camera and a flash system, a foreground subject can be overexposed while a background section is underexposed due to the limited dynamic range of an image sensor and the use of flash that is not powerful enough to illuminate the whole scene. This is particularly problematic in cameras integrated with mobile phones because design constraints impose size restrictions on lenses and image sensors of the mobile phones, thereby limiting the amount of light that can reach the image sensors. As a result, the captured image may appear noisy and overly dark, and elements in the foreground can be overexposed. The image quality may be improved by performing post-processing on the image, however, the post-processing requires additional processing time and resources, and can be inconvenient for a user.

SUMMARY

According to an aspect of an exemplary embodiment, there is provided an apparatus for illuminating a scene to be captured, the apparatus including: an illumination source configured to illuminate the scene; an adaptive optical element configured to be controlled to change an illumination in the scene by the illumination source; and a controller configured to determine an illumination pattern corresponding to the scene, and configured to control the adaptive optical element to change the illumination in the scene by the illumination source based on the determined illumination pattern.

The controller may be further configured to obtain pre-capture data related to the scene, and configured to determine the illumination pattern based on the pre-capture data.

The pre-capture data may include data related to illumination levels of areas within the scene, and the controller may be further configured to determine the illumination pattern in which a higher illumination level is set for an area having a lower illumination level within the scene and a lower illumination level is set for an area having a higher illumination level within the scene.

The controller may be further configured to obtain the data related to illumination levels from an image sensor that is configured to capture an image of the scene.

The pre-capture data may include colour information related to a plurality of elements within the scene, and the controller may be further configured to determine the illumination pattern in which a higher illumination level is set for a first element, which is determined to reflect less light from the illumination source based on color information of the first element, and a lower illumination level is for a second element, which is determined to reflect more light from the illumination source based on color information of the second element.

The pre-capture data may include image data captured from the scene using an image sensor that is configured to capture an image of the scene, and the apparatus may further include: a foreground separator configured to separate a foreground element and a background in the scene based on the image data, wherein the controller is configured to determine the illumination pattern in which an illumination level set for the foreground element is different from an illumination level set for the background.

The adaptive optical element may be further configured to have an optical property including at least one of a refractive index and reflectivity.

The controller may be further configured to control at least one of an exposure time and an exposure intensity of the illumination source.

The controller may be further configured to obtain information about a dynamic range of an image sensor that is configured to capture an image of the scene, and configured to determine the illumination pattern based on the dynamic range of the image sensor.

The adaptive optical element may include at least one of an adaptive microlens array and a shape controlled lens.

The adaptive optical element may include one or more lenses configured to be moveable in a forward or rear direction on an optical path of light between the illumination source and the scene.

The illumination source may include a plurality of light emitting elements.

The controller may be configured to separate a foreground element and a background within the scene based on an illumination level within the scene.

According to an aspect of another exemplary embodiment, there is provided a control method of an apparatus for illuminating a scene to be captured, the apparatus including an illumination source configured to illuminate the scene and an adaptive optical element configured to be controlled to change an illumination in the scene by the illumination source, the control method including: determining an illumination pattern corresponding to the scene; and controlling the adaptive optical element to change the illumination in the scene by the illumination source based on the determined illumination pattern.

The control method may further include obtaining pre-capture data related to the scene, wherein the determining includes determining the illumination pattern based on the pre-capture data.

The determining the illumination pattern based on the pre-capture data may include determining the illumination pattern in which a higher illumination level is set for an area having a low illumination level within the scene and a lower illumination level is set for an area having a higher illumination level within the scene.

The control method may further include obtaining data related to illumination levels from an image sensor that is configured to capture an image of the scene.

The pre-capture data may include colour information related to a plurality of elements within the scene, and the determining the illumination pattern based on the pre-capture data may include: determining the illumination pattern in which a higher illumination level is set for a first element, which is determined to reflect less light from the illumination source based on color information of the first element, and a lower illumination level is set for a second element, which is determined to reflect more light from the illumination source based on color information of the second element.

The pre-capture data may include image data captured from the scene using an image sensor that is configured to capture an image of the scene, and the method may further include: separating a foreground element and a background in the scene based on the image data, wherein the determining the illumination pattern based on the pre-capture data includes determining the illumination pattern in which an illumination level set for the foreground element is different from an illumination level set for the background.

The adaptive optical element may be configured to have an optical property including at least one of a refractive index and reflectivity.

The control method may further include controlling at least one of an exposure time and an exposure intensity of the illumination source.

The control method may further include obtaining information about a dynamic range of an image sensor that is configured to capture an image of the scene, wherein the illumination pattern is determined based on the dynamic range of the image sensor.

According to an aspect of still another exemplary embodiment, there is provided a non-transitory computer-readable storage medium storing computer program instructions which, when executed, cause a computer to perform the above control method.

According to an aspect of still another exemplary embodiment, there is provided an apparatus for capturing an image, the apparatus including: an illumination source configured to illuminate a scene; an image sensor configured to capture the image of the scene; and a controller configured to determine an illumination pattern based on information about the scene, and configured to control an illumination in the scene by the illumination source based on the determined illumination pattern.

The information about the scene may include information about at least one of an illumination level and a color within the scene.

The apparatus may further include an adaptive optical element positioned between the illumination source and the scene, wherein the adaptive optical element includes at least one of an adaptive microlens array, a shape controlled lens, and a micromirror array.

The controller may be further configured to control the adaptive optical element to switch or move the adaptive optical element, or change a shape of the adaptive optical element.

The controller may be configured to control an illumination in the scene by controlling at least one of an exposure time and an exposure intensity of the illumination source based on the determined illumination pattern.

BRIEF DESCRIPTION OF THE DRAWINGS

The above and/or other aspects will become more apparent by describing certain exemplary embodiments with reference to the accompanying drawings, in which.

DETAILED DESCRIPTION

Figure 1:
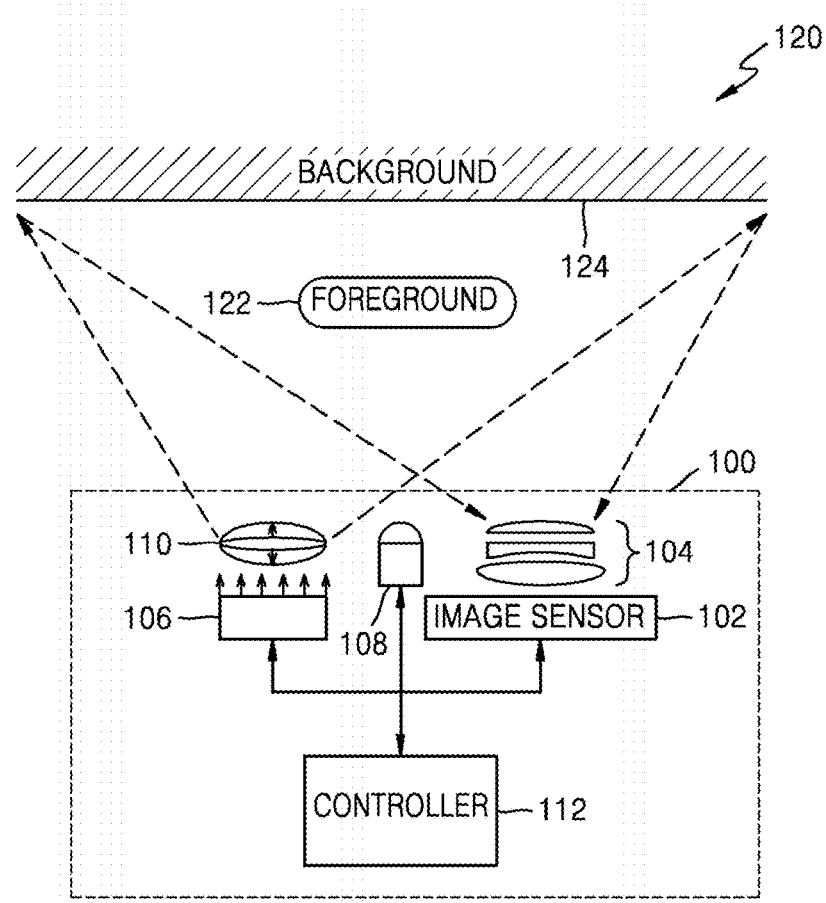
FIG. 1 schematically illustrates an image capture device, according to an exemplary embodiment.

Certain exemplary embodiments are described in greater detail below with reference to the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description. Sizes of elements in the drawings may be exaggerated for convenience of explanation. In other words, since sizes and thicknesses of components in the drawings are arbitrarily illustrated for convenience of explanation, the following exemplary embodiments are not limited thereto.

Referring now to FIG. 1, an image capture device according to an exemplary embodiment will be described. In an exemplary embodiment, the image capture device is included in a mobile communication device, e.g., a smartphone. However, exemplary embodiments are not limited thereto, and can be applied to image capture systems in any type of devices, including but not limited to, stand-alone digital cameras, camcorders, webcams, tablet computers, laptops and desktop computers, wearable cameras, surveillance cameras, and speed cameras.

An image capture device 100 comprises an image sensor 102, such as a charge coupled device (CCD) or a complementary metal-oxide-semiconductor (CMOS) sensor, configured to capture an image of a scene 120, one or more lenses 104 configured to focus light from the scene 120 onto the image sensor 102, an illumination source 106 configured to illuminate the scene 120, and a light meter 108 configured to obtain information about light levels within the scene 120. In an exemplary embodiment, the illumination source 106 comprises a light emitting diode (LED) based flash, which can be triggered immediately before capturing an image to provide additional illumination to the scene 120. However, in another exemplary embodiment, a different type of illumination sources such as a Xenon flash may be used.

Also, the image capture device 100 further comprises an adaptive optical element 110 controllable to change an illumination in the scene 120 by the illumination source 106, and a controller 112. The controller 112 is configured to determine an illumination pattern of the illumination in the scene 120, and to control the adaptive optical element 110 to provide the illumination pattern when an image is captured by the image sensor 102.

In an exemplary embodiment, the illumination source 106 may include a plurality of discrete light emitting elements, for example a plurality of LEDs. When a plurality of discrete light emitting elements are used, each light emitting element may be provided with a separate adaptive optical element. Alternatively, some or all of the light emitting elements may share the same adaptive optical element, such that a given adaptive optical element receives light from two or more the light emitting elements.

Various types of adaptive optical elements can be used alone or in combination in exemplary embodiments. The adaptive optical element may be configured to have one or more variable optical properties, such as reflectivity or a refractive index. Examples of adaptive optical elements having variable optical properties include, but are not limited to, shape-controlled lenses, such as liquid lenses and sound-controlled lenses, adaptive microlens arrays, and micromirror arrays. In a liquid lens, the refractive index of the liquid can be electrically tuned using the Kerr effect, to control the focal length of the lens. Alternatively, the refractive index of the adaptive optical element can be controlled by changing the dielectric permittivity or magnetic permeability of a material included in the adaptive optical element, for example, by applying an external electric field to the adaptive optical element.

Instead of, or in addition to, an optical element having variable optical properties, in some exemplary embodiments, the adaptive optical element may include one or more elements having fixed optical properties, such as a fixed-focus lens configured to be mechanically moveable from one position to another.

In more detail, the controller 112 is configured to control the adaptive optical element 110 so that the scene 120 may be properly exposed when illuminated by the illumination source 106. The controller 112 may determine a suitable illumination pattern for the scene 120 based on various types of information. In an exemplary embodiment, the controller 112 is configured to obtain pre-capture data from the image sensor 102 and the light meter 108. The pre-capture data provides information relating to the scene 120 to be captured, and can be used to determine the illumination pattern. In addition to, or instead of, obtaining pre-capture data, the controller 112 may obtain information about a dynamic range of the image sensor 102, and used the information about the dynamic range in determining the illumination pattern.

In another exemplary embodiment, in addition to or instead of obtaining pre-capture data, the controller 112 may obtain information about a dynamic range of the image sensor 102 and/or thermal dark current and/or noise associated therewith, and determine the illumination pattern based on the obtained information.

The illumination pattern can be defined in various ways. In some exemplary embodiments, the illumination pattern can simply be expressed in terms of control parameters which are used to control the adaptive optical element. In other exemplary embodiments, the illumination pattern may be stored as an array of values that define different illumination levels at different x-y coordinates within the scene 120. Depending on the type of adaptive optical element that is used, suitable control parameters for the adaptive optical element can be determined based on the illumination pattern.

The image data can be analysed using a foreground separation algorithm, to separate a foreground element 122 from a background 124. When the foreground element 122 is identified, the controller 112 can set different illumination levels for the foreground element 122 and the background 124 when determining the illumination pattern. Normally, a higher illumination level may be set for the background 124, to achieve an even exposure across the scene 120. However, in some cases, a higher illumination level may be set for the foreground element 122, for example, when the foreground element 122 is darker in colour than the background 124, and/or in shadow in comparison to the background 124.

Also, as described above, in an exemplary embodiment, the controller 112 uses light meter data that is received from the light meter 108. The light meter data relates to light levels within the scene 120. Depending on the type of light meter that is used, the light meter data may be expressed as a single average value relating to ambient light levels across the scene 120 as a whole, or may include a plurality of values each associated with a different area within the scene 120. When granular information about light levels within the scene 120 is available, the controller 112 can set a higher illumination level for a darker area within the scene 120 and set a lower illumination level for a lighter area within the scene 120 when determining the illumination pattern. Here, the terms 'darker' and 'lighter' areas are used to refer to areas with lower and higher Lux values (or illumination values), respectively.

In addition to controlling the adaptive optical element 110, in some exemplary embodiments, the controller 112 can also control the exposure time and/or the exposure intensity of the illumination source 106 to achieve the desired illumination pattern.

Although it is described that the light meter data relating to light levels within the scene 120 is obtained from a separate light meter 108 in an exemplary embodiment, the light meter data may not be used, or may be captured by using the image sensor 102 in other exemplary embodiments. For example, the image sensor 102 can be used to pre-capture an image before capturing a final image of the scene 120 illuminated by the flash. The pre-capture image can be analysed to extract information about light levels within the scene 120, which may be expressed as lux values for individual pixels or groups of pixels. By using the image sensor 102 to obtain the light meter data, the separate light meter can be omitted, and higher-resolution information about light levels within the scene 120 can be obtained.

In an exemplary embodiment, the illumination pattern is determined based on pre-capture data. In some exemplary embodiments, the pre-capture data can include colour information relating to a plurality of elements within the scene 120, in addition to or instead of the other types of pre-capture data described above. When colour information is available, the controller 112 can estimate the amount of light from the illumination source 106 that will be reflected by each element in the scene 120, and set the illumination pattern accordingly. The controller 112 can set a higher illumination level can be set for an element that is estimated to reflect less light from the illumination source 106, and set a lower illumination level for an element that is estimated to reflect more light from the illumination source 106. For example, a predominately black object will reflect less light than a predominately white object. To avoid a pale object appearing over-exposed in the final image, a lower illumination level can be used for the object. Similarly, a higher illumination level can be used for a darker-coloured object, to avoid the object appearing under-exposed. By using this approach, the level of reflected light reaching the image sensor 102 when capturing the image may become substantially uniform across the scene 120.

In the exemplary embodiment shown in FIG. 1, the adaptive optical element 110 and the controller 112 are included in the image capture device 100 together with other elements of the image capture device 100, including the image sensor 102 and the illumination source 106. However, in other exemplary embodiments, the adaptive optical element 110, the controller 112 and/or the illumination source 106 may be embodied in a separate device from a device in which the image sensor 102 is included. For example, the adaptive optical element 110 and/or the controller 112 may be provided in a separate device configured to be mechanically attached to a related art smartphone device, and to communicate wirelessly with a camera controller in the smartphone. The illumination source 106 can be included in the smartphone or in the separate device.

Figure 2A:
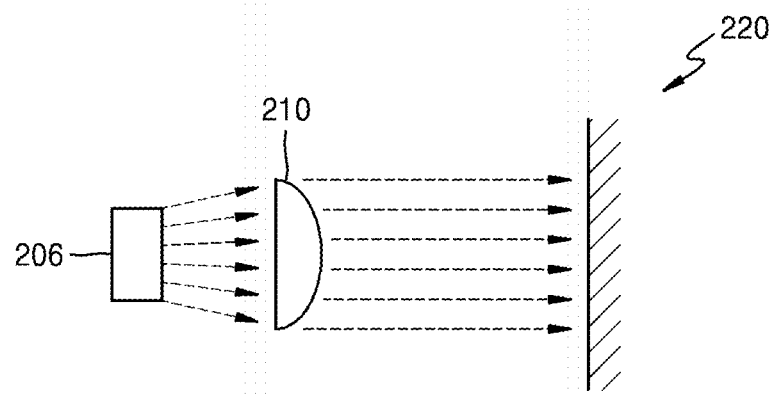
FIGS. 2A to 2C schematically illustrate different illumination patterns obtained using a shape-controlled lens as an adaptive optical element, according to an exemplary embodiment.
Figure 2B:
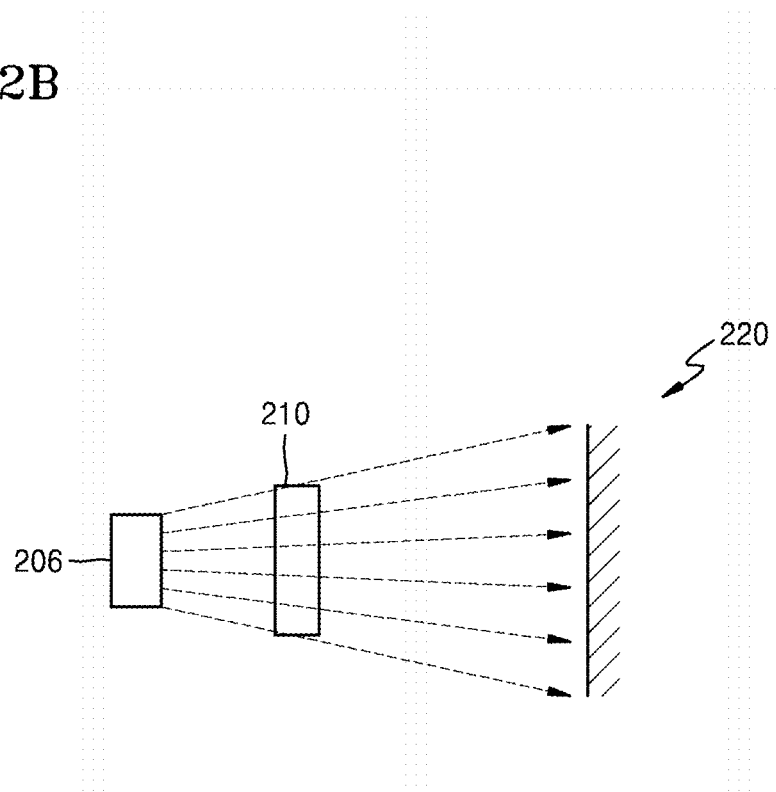
Figure 2C:
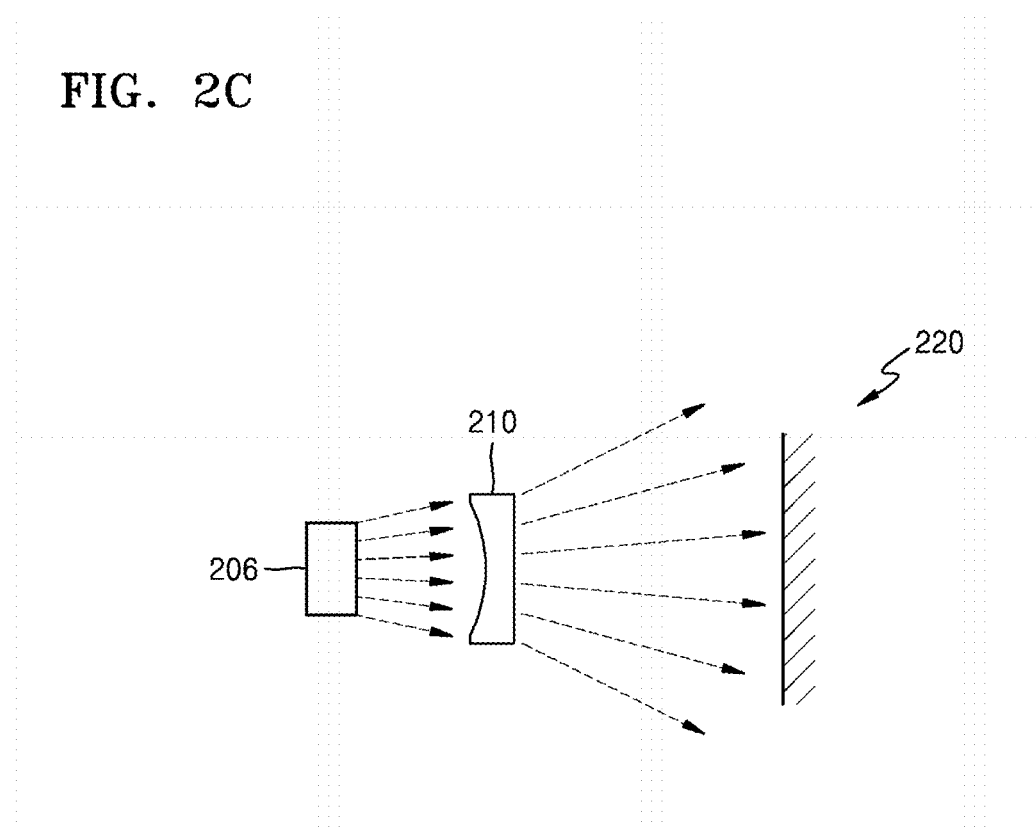

FIGS. 2A to 2C schematically illustrate different illumination patterns obtained using a shape-controlled lens as an adaptive optical element, according to an exemplary embodiment. Various types of shape-controlled lens are known in the art, such as liquid lenses and sound-controlled lenses, and a detailed description will be omitted to avoid obscuring the inventive concept. In FIG. 2A, the shape-controlled lens 210 is controlled to adopt a plano-convex lens shape, to focus light emitted from an illumination source 206 onto a scene 220. In FIG. 2B, the shape-controlled lens 210 is controlled to adopt a neutral lens shape, so that the path of light from the illumination source 206 is unaffected by the shape-controlled lens 210. In FIG. 2C, the shape-controlled lens 210 is controlled to adopt a plano-convex lens shape, to disperse light emitted from the illumination source 206 widely over the scene 220.

Figure 3:
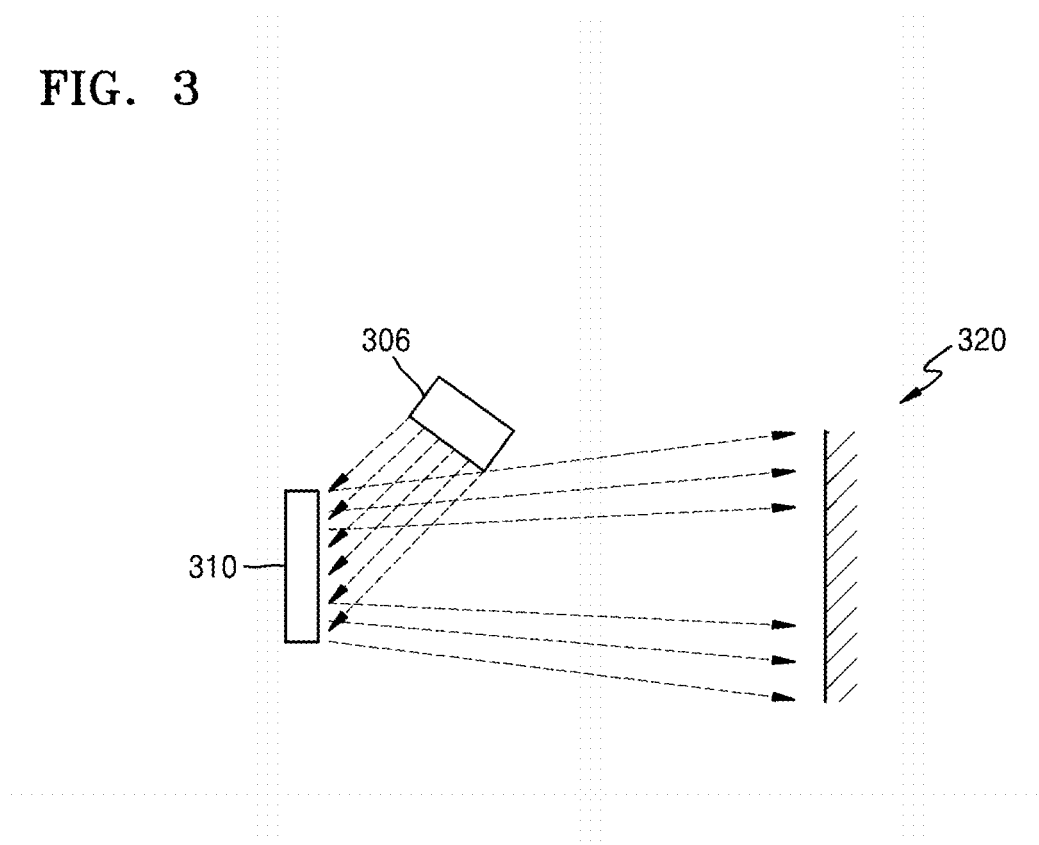
FIG. 3 illustrates an adaptive optical element comprising a micromirror array, according to an exemplary embodiment.
Figure 4:
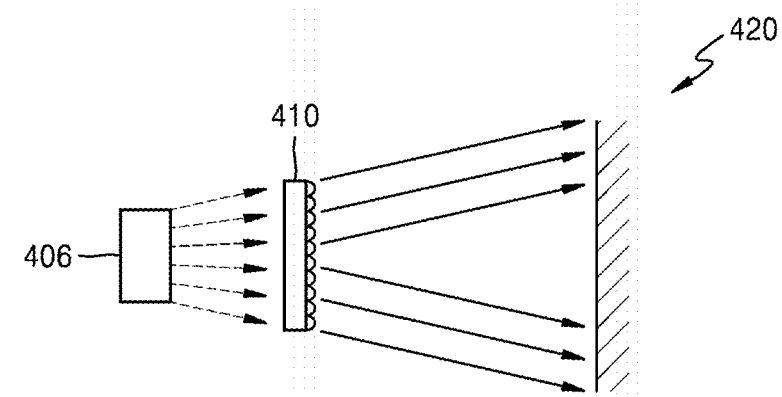
FIG. 4 illustrates an adaptive optical element comprising a microlens array, according to an exemplary embodiment.
Figure 5:
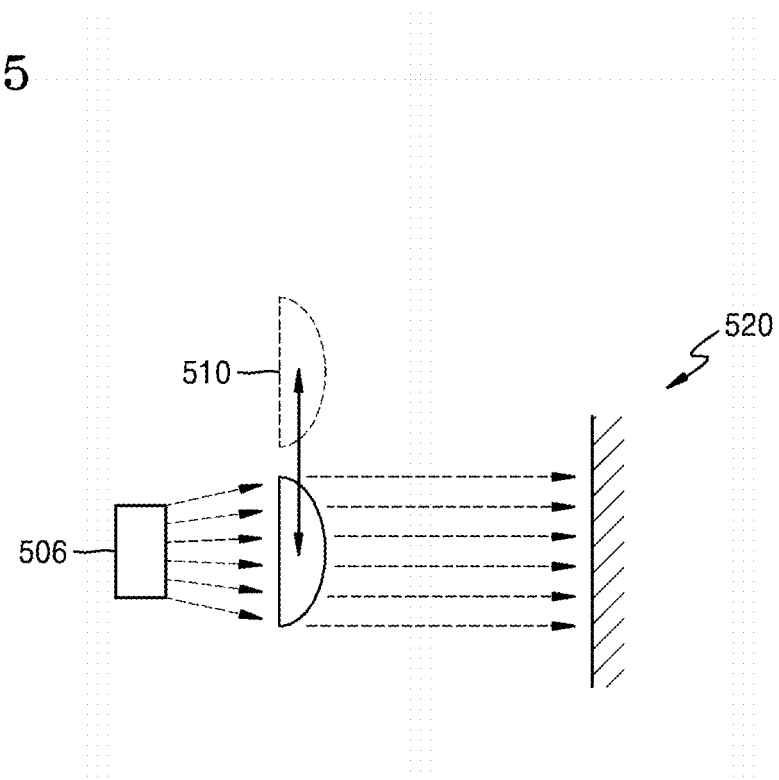
FIG. 5 illustrates an adaptive optical element comprising a moveable lens, according to an exemplary embodiment.

As described above, exemplary embodiments are not limited to shape-controlled lenses as the adaptive optical element. Other types of adaptive optical elements are schematically illustrated in FIGS. 3 to 5. In FIG. 3, an exemplary embodiment is illustrated in which an adaptive optical element 310 comprises a micromirror array, similar to a digital micromirror device (DMD) used in a digital light processing (DLP) projector. The micromirror array 310 includes a plurality of independently controllable micromirrors which can be individually switched to reflect light from an illumination source 306 towards or away from a scene 320. In the exemplary embodiment shown in FIG. 3 the micromirror array 310 is set to direct light towards a periphery of the scene 320, but the micromirror array 310 may be controlled to provide any other desired illumination pattern.

In FIG. 4, an exemplary embodiment is illustrated in which an adaptive optical element 410 comprises an adaptive microlens array disposed between an illumination source 406 and a scene 420. The microlens array 410 includes an array of adaptive microlenses, which may, for example, include miniature liquid lenses. The shape of each lens can be independently controlled to achieve a desired illumination pattern for the scene 420.

In FIG. 5, an exemplary embodiment is illustrated in which an adaptive optical element 510 comprises a lens configured to be moveable into and out of an optical path between an illumination source 506 and a scene 520. Although a single lens 510 is illustrated in the exemplary embodiment of FIG. 5, a plurality of lens may be provided in other exemplary embodiments. When a plurality of moveable lenses are used, different combinations of lenses may be moved into and out of the optical path to achieve different illumination patterns.

Various different types of the adaptive optical element have been described above with reference to FIGS. 2A to 5. In exemplary embodiments, any of the various types of the adaptive optical element may be used alone or in combination with other types, to achieve a desired illumination pattern.

Figure 6:
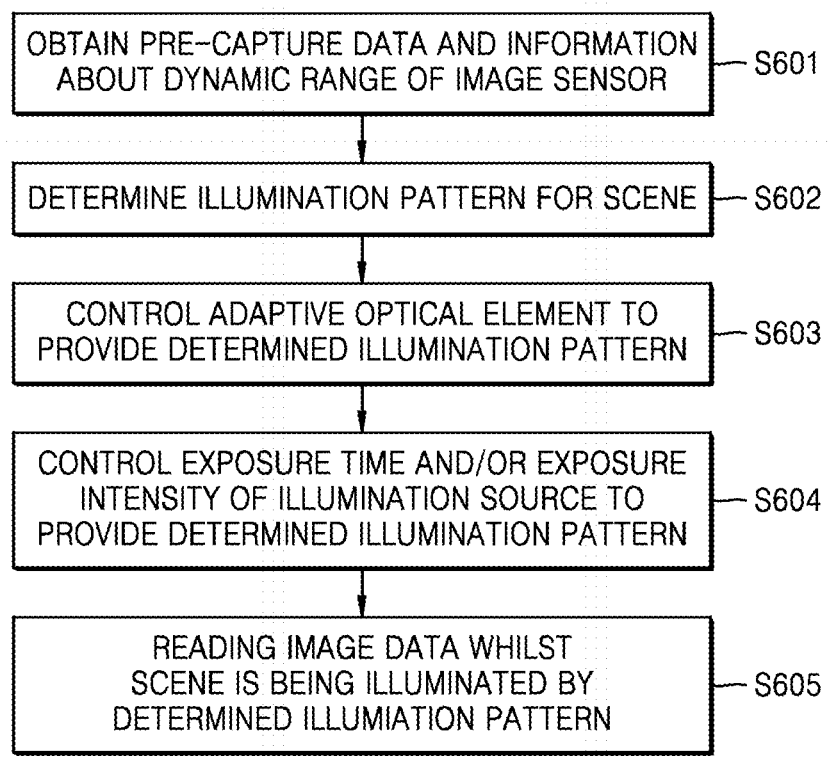
FIG. 6 is a flowchart showing a control method of an image capture device, according to an exemplary embodiment.

Referring now to FIG. 6, a flowchart showing a control method of an image capture device is illustrated, according to an exemplary embodiment. The method illustrated in FIG. 6 can be performed by using the controller 112 of FIG. 1 to achieve an even exposure across a scene that is being imaged. Depending on an embodiment, some or all of operations in FIG. 6 may be performed by dedicated hardware such as an application-specific integrated circuit (ASIC) or a field programmable gate array (FPGA), or may be performed in software by computer program instructions stored in a memory and executed on one or more processors.

First, in operation S601, pre-capture data relating to the scene is obtained. The pre-capture data may include various types of information, for example, light meter data, image data, and/or colour data. In an exemplary embodiment, information about the dynamic range of the image sensor may also be obtained in operation S601.

Next, in operation S602, an illumination pattern is determined for the scene. In an exemplary embodiment, the illumination pattern is determined based on the pre-capture data and dynamic range information obtained in operation S601. However, as explained above, in some embodiments, the pre-capture data and/or dynamic range information may be omitted, when, for example, pre-programmed illumination patterns are stored for different camera modes, in which case operation S601 may be modified as appropriate or omitted entirely.

Then, in operation S603, the adaptive optical element is controlled to provide the illumination pattern when the image is captured by the image sensor. In some embodiments, the adaptive optical element controller may operate as a slave to a separate master controller (or image sensor controller) which controls the operation of the image sensor. For example, the image sensor controller may signal to the adaptive optical element controller when an image is about to be captured, at which point the adaptive optical element may be switched to provide the desired illumination pattern. The image sensor controller may separately trigger the illumination source and read image data from the image sensor as normal. However, in an exemplary embodiment, the controller 112 may also control the operation of the illumination source in operation S604 and the image sensor in operation S605. Specifically, in operation S604 the illumination source is controlled to illuminate the scene, based on a suitable exposure time and/or exposure intensity necessary to provide the desired illumination pattern. In operation S605, image data is read from the image sensor while the scene is being illuminated.

By adapting the illumination pattern according to the content of a scene, using a method as shown in FIG. 1, exemplary embodiments can achieve a more uniform exposure across the scene without the need for post-processing on the image.

Figure 7:
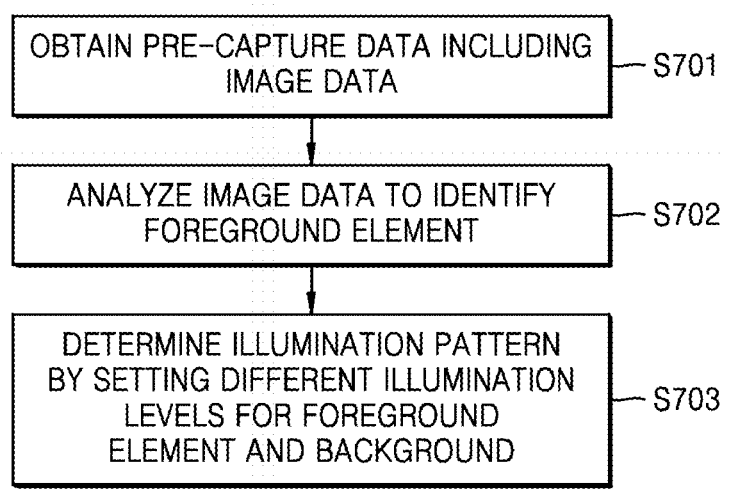
FIG. 7 is a flowchart showing a method of determining an illumination pattern based on pre-capture image data, according to an exemplary embodiment.

As explained above, various different types of pre-capture data can be used when determining the illumination pattern. A method of determining an illumination pattern based on pre-capture image data will now be described with reference to FIG. 7. First, in operation S701, pre-capture data including image data is obtained. The image data may be obtained using the image sensor, or may be obtained using a separate dedicated sensor. For example, the pre-capture image data may be obtained using a separate low-resolution sensor.

Then, in operation S702, the image data is analysed to identify a foreground element in the scene, and in operation S703, the illumination pattern is determined by setting different illumination levels for the foreground element and for the background, as described above.

By using image data to separate the foreground element from the background in the scene, the adaptive optical element can be controlled to avoid over-exposing the foreground, which is a problem when capturing images in low-light conditions using related art cameras and flash systems. Also, by enabling the scene to be properly exposed by the illumination source, exemplary embodiments can avoid the need to switch to a higher ISO setting in low-light conditions, which may introduce more noise into the captured image. Accordingly, exemplary embodiments can provide higher-quality images under low-light conditions.

Figure 8:
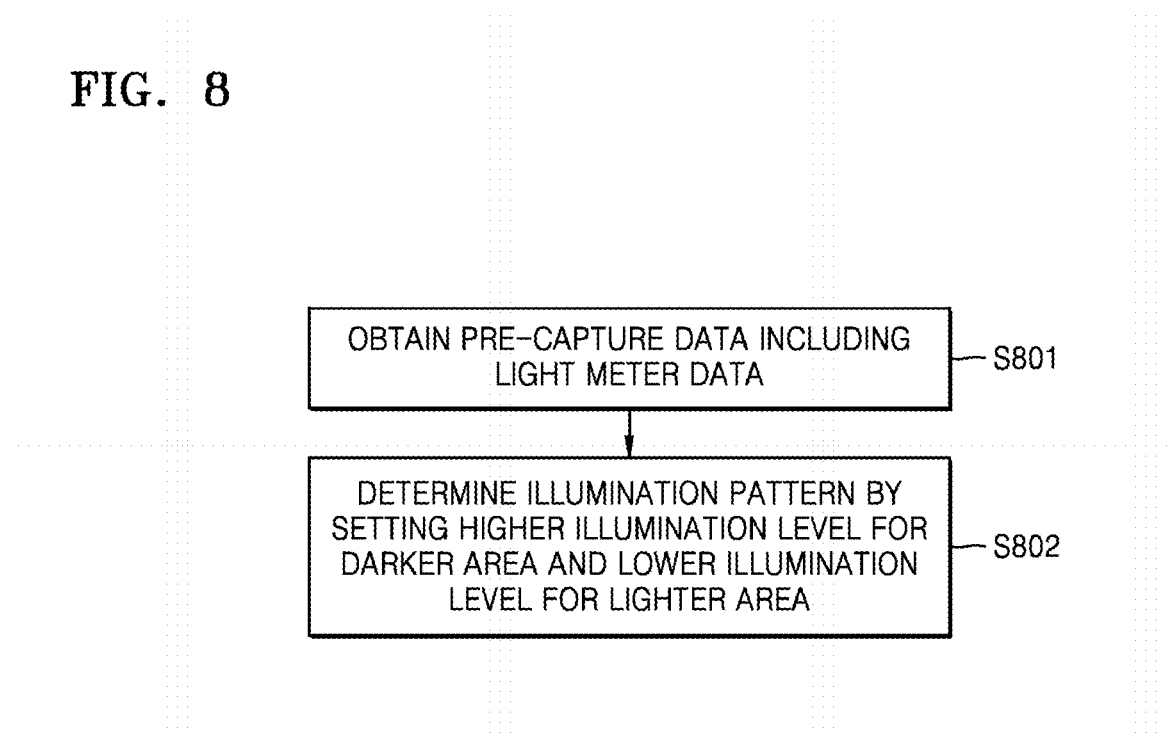
FIG. 8 is a flowchart showing a method of determining an illumination pattern based on pre-capture light meter data, according to an exemplary embodiment.

A method of determining an illumination pattern based on pre-capture light meter data will now be described with reference to FIG. 8. First, in operation S801, pre-capture data including light meter data is obtained. As described above, the light meter data may be obtained from the image sensor, or from a separate light meter sensor. In an exemplary embodiment, the light meter data may include a plurality of values relating to ambient light levels at different locations within the scene.

Then, in operation S802, the illumination pattern is determined based on the light meter data, by setting a higher illumination level for a darker area within the scene and setting a lower illumination level for a lighter area within the scene. In this manner, a more uniform exposure across the scene may be achieved when the final image is captured.

Figure 9:
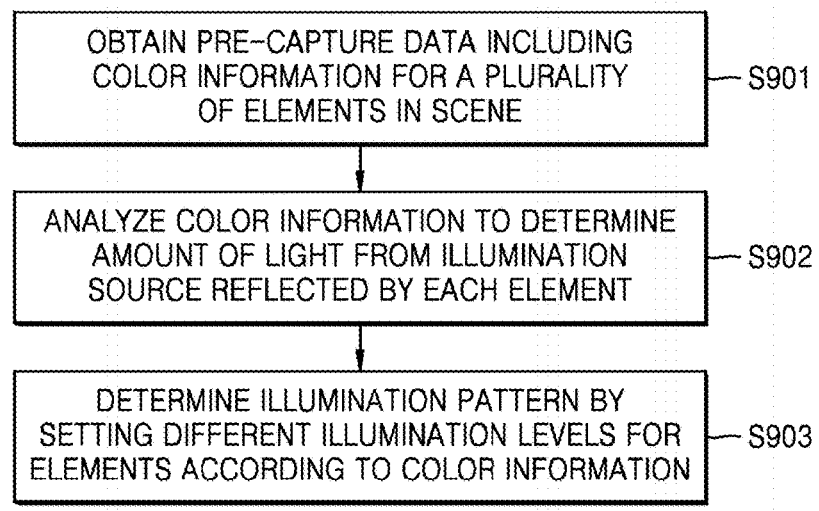
FIG. 9 is a flowchart showing a method of determining an illumination pattern based on colour information, according to an exemplary embodiment.

A method of determining an illumination pattern based on colour information will now be described with reference to FIG. 9. First, in operation S901, pre-capture data including colour information is obtained. The colour information may be obtained using the same image sensor that is used to capture the final image of the scene when illuminated by the illumination source, or may be obtained using a separate dedicated sensor. For example, the colour information may be obtained using a separate low-resolution sensor.

Then, in operation S902, the image data is analysed to determine the amount of light from the illumination source to be reflected by each one of a plurality of elements in the scene. As explained above, objects that are paler in colour reflect more light from the illumination source, and objects that are darker in colour reflect less light. In operation S903 the illumination pattern is determined by setting different illumination levels for the elements according to the colour information for each element, as described above.

By using colour information to determine an amount of light from the illuminate source to be reflected by each element in the scene, the adaptive optical element can be controlled to avoid over-exposing lighter coloured objects and under-exposing darker coloured objects.

Figure 10:
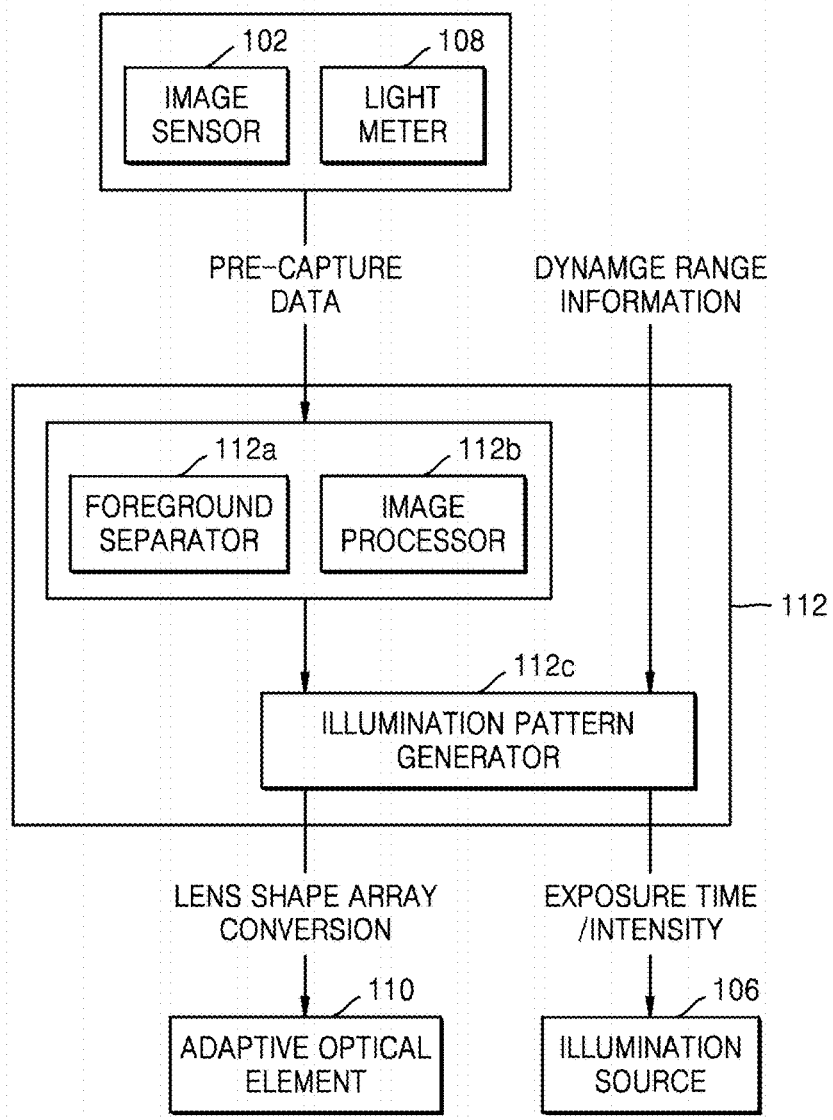
FIG. 10 schematically illustrates the controller of FIG. 1.

Referring now to FIG. 10, the controller 112 of FIG. 1 is schematically illustrated. As shown in FIG. 10, the controller 112 includes a foreground separator 112a, an image processor 112b, and an illumination pattern generator 112c. Depending on an embodiment, the foreground separator 112a may be implemented using a software algorithm, dedicated hardware, or a combination of hardware and software. Various methods for separating one or more foreground objects in an image from the background are known in the art, and a detailed description will not be provided here.

The foreground separator 112a and image processor 112b receive the pre-capture data, including image data and light meter data, from the image sensor 102 and the light meter 108. The foreground separator 112a performs foreground separation based on the pre-capture image data, and determines a relative size and position of one or more foreground elements in the scene. The image processor 112b uses the image data and the light meter data to obtain information about light levels in an x-y plane of the scene, foreground colour information in the x-y plane, and light levels in the background. The obtained information is passed to the illumination pattern generator 112c, which retrieves dynamic range information stored in a memory. The illumination pattern generator 112c determines an illumination pattern by setting illumination levels within the x-y plane of the scene based on the information received from the foreground separator 112a and the image processor 112b, taking into account the dynamic range of the image sensor 102. The illumination pattern generator 112c outputs control signals to the adaptive optical element 110 and the illumination source 106. Depending on an embodiment, the control signals sent to the adaptive optical element 110 may include a command to change the shape of one or more shape-controlled lenses, and/or a command to switch an array of microlenses and/or micromirrors, and/or a command to move one or more moveable lenses into or out of the optical path of light. Also, depending on an embodiment, the control signal signals sent to the illumination source 106 may include a command to set the exposure time and/or a command to set the exposure intensity.

A system as shown in FIG. 10 can be used to perform any of the above-described methods, to provide more uniform illumination levels when a scene is illuminated by the illumination source.

FIGS. 11A, 11B, 12A, and 12B illustrate images before and after an illumination pattern is applied thereto, according to an exemplary embodiment.

Figure 11A:
FIGS. 11A, 11B, 12A, and 12B illustrate images before and after an illumination pattern is applied thereto, according to an exemplary embodiment.
Figure 12A:
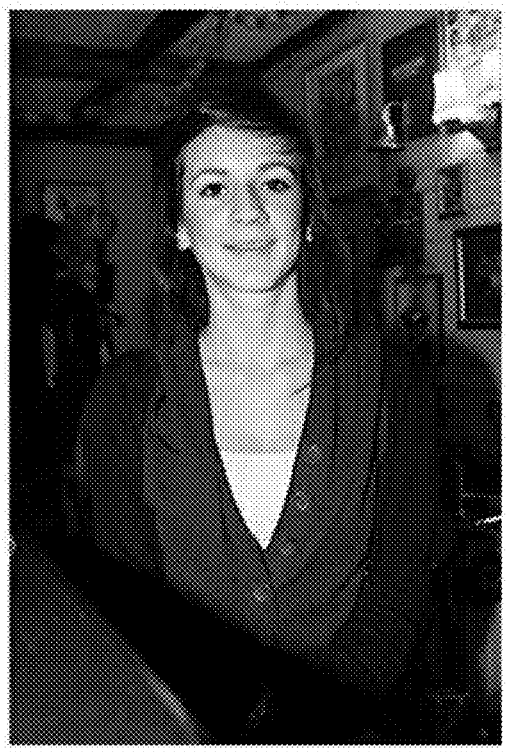

FIGS. 11A and 12A illustrate images captured in a scene which is not provided with an appropriate amount of light. As illustrated in FIGS. 11A and 12A, the scene can be separated into a foreground element including a face and an upper body of a subject and a background showing an environment in which the subject is located. When capturing an image of the subject, the amount of light may not be properly adjusted (e.g., the face portion may be overexposed by a large amount of light) so that a pale image of the foreground element (e.g., the face) is obtained. In this case, there may be a need for additional processing, such as post-processing, to appropriately adjust the brightness of the foreground element.

Figure 11B:
Figure 12B:

FIGS. 11B and 12B illustrate images captured by using the adaptive optical element and the controller, according to an exemplary embodiment. The controller can determine a uniform illumination pattern for the face corresponding to the foreground element and the background such that an appropriate amount of light is provided to the face of the subject.

The controller may pre-capture the image before capturing the image and obtain pre-capture data based on the pre-captured image, to determine the illumination pattern. The pre-capture data may include data related to illumination levels within the scene. Thus, the controller may determine the illumination pattern of the scene based on the pre-capture data. For example, the controller may set a lower illumination level for a section (e.g., the face of the subject) corresponding to the foreground element which is determined as a lighter area and set a higher illumination level for a section corresponding to the background which is determined as a darker area. Then, a device such as a camera captures the image of the subject based on the determined illumination pattern, thereby obtaining the images having uniform brightness, as illustrated in FIGS. 11B and 12B.

Exemplary embodiments have been described in which an illumination pattern is determined based on pre-capture data, for example, data received from a light meter sensor and/or a camera image sensor. However, in other exemplary embodiments, pre-capture data may not be used, and another approach to determine a suitable illuminate pattern may be used. In some embodiments, the image capture device may store various predefined illumination patterns each associated with a different camera mode. For example, when a 'portrait' mode is selected, it may be assumed that a foreground object is located approximately centrally in the scene. Accordingly, a predefined illumination pattern can be used in which a lower illumination level is set for a central region, and a higher illumination level is set for a peripheral region.

While certain exemplary embodiments have been described herein with reference to the drawings, it will be understood that many variations and modifications will be possible without departing from the scope of the invention as defined in the accompanying claims.

What is claimed is:

1. An apparatus for illuminating a scene to be captured, the apparatus comprising:
    an illumination source configured to illuminate the scene including at least one foreground element and a background, the at least one foreground element including a first plurality of elements, and the background including a second plurality of elements;
    an adaptive optical element configured to be controlled to change an illumination in the scene by the illumination source; and
    a controller configured to:
        obtain pre-capture data related to the scene, the pre-capture data including color information, which indicates a color value of each of the first plurality of elements and the second plurality of elements within the scene;
        identify the at least one foreground element and the background in the scene based on the pre-capture data;
        determine an illumination pattern corresponding to the scene by setting different illumination levels for each of the at least one foreground element and the background and by setting different illumination levels for each of the first plurality of elements in the at least one foreground element and the second plurality of elements in the background, based on the color information, and
        control the adaptive optical element to change the illumination in the scene by the illumination source based on the determined illumination pattern.

2. The apparatus of claim 1, wherein the pre-capture data comprises data related to the illumination levels of areas within the scene, and
    the controller is further configured to determine the illumination pattern in which a higher illumination level is set for an area having a lower illumination level within the scene and a lower illumination level is set for an area having a higher illumination level within the scene.

3. The apparatus of claim 2, wherein the controller is further configured to obtain the data related to the illumination levels from an image sensor that is configured to capture an image of the scene.

4. The apparatus of claim 1,
    the controller is further configured to determine the illumination pattern in which a higher illumination level is set for an element, which is determined to reflect less light from the illumination source based on the color information, and a lower illumination level is for an element, which is determined to reflect more light from the illumination source based on the color information.

5. The apparatus of claim 1, wherein the pre-capture data comprises image data captured from the scene using an image sensor that is configured to capture an image of the scene.

6. The apparatus of claim 1, wherein the adaptive optical element is further configured to have an optical property comprising at least one of a refractive index and reflectivity.

7. The apparatus of claim 1, wherein the controller is further configured to control at least one of an exposure time and an exposure intensity of the illumination source.

8. The apparatus of claim 1, wherein the controller is further configured to obtain information about a dynamic range of an image sensor that is configured to capture an image of the scene, and configured to determine the illumination pattern based on the dynamic range of the image sensor.

9. The apparatus of claim 1, wherein the adaptive optical element comprises at least one of an adaptive microlens array and a shape controlled lens.

10. The apparatus of claim 1, wherein the adaptive optical element comprises one or more lenses configured to be moveable in a forward or rear direction on an optical path of light between the illumination source and the scene.

11. The apparatus of claim 1, wherein the illumination source comprises a plurality of light emitting elements.

12. The apparatus of claim 1, wherein the controller is configured to separate a foreground element and a background within the scene based on the illumination levels within the scene.

13. A control method of an apparatus for illuminating a scene to be captured, the apparatus comprising an illumination source configured to illuminate the scene and an adaptive optical element configured to be controlled to change an illumination in the scene by the illumination source, the control method comprising:
    obtaining pre-capture data related to the scene including at least one foreground element and a background, the at least one foreground element including a first plurality of elements, and the background including a second plurality of elements, the pre-capture data including color information, which indicates a color value of each of the first plurality of elements and the second plurality of elements;

identifying the at least one foreground element and the background in the scene based on the pre-capture data;

determining an illumination pattern corresponding to the scene by setting different illumination levels for each of the at least one foreground element and the background and by setting different illumination levels for each of the first plurality of elements in the at least one foreground element and the second plurality of elements in the background, based on the color information; and controlling the adaptive optical element to change the illumination in the scene by the illumination source based on the determined illumination pattern.

14. The control method of claim 13, wherein the determining the illumination pattern based on the pre-capture data comprises determining the illumination pattern in which a higher illumination level is set for an area having a low illumination level within the scene and a lower illumination level is set for an area having a higher illumination level within the scene.

15. The control method of claim 14, further comprising:
obtaining data related to the illumination levels from an image sensor that is configured to capture an image of the scene.

16. The control method of claim 13, wherein the determining the illumination pattern based on the pre-capture data comprises:
determining the illumination pattern in which a higher illumination level is set for an element, which is determined to reflect less light from the illumination source based on the color information, and a lower illumination level is set for an element, which is determined to reflect more light from the illumination source based on the color information.

17. The control method of claim 13, wherein the pre-capture data comprises image data captured from the scene using an image sensor that is configured to capture an image of the scene.

18. The control method of claim 13, wherein the adaptive optical element is configured to have an optical property comprising at least one of a refractive index and reflectivity.

19. The control method of claim 13, further comprising:
controlling at least one of an exposure time and an exposure intensity of the illumination source.

20. The control method of claim 13, further comprising:
obtaining information about a dynamic range of an image sensor that is configured to capture an image of the scene,
wherein the illumination pattern is determined based on the dynamic range of the image sensor.

21. A non-transitory computer-readable storage medium storing computer program instructions which, when executed, cause a computer to perform the control method of claim 13.

22. The apparatus of claim 1, wherein the illumination pattern is an array of values that define the different illumination levels at different x-y coordinates within the scene.

23. The apparatus of claim 1, wherein the pre-capture data related to the scene corresponds to a capture of the scene at a single time.

* * * * *